July 28, 1970   L. R. LOVELOCK ET AL   3,522,121
METHOD OF BONDING A FILLED EPOXIDE PUTTY TO A SURFACE
Filed Nov. 8, 1966

Inventors
LEONARD R. LOVELOCK
ROBERT H. WREN

By
Attorney

United States Patent Office 3,522,121
Patented July 28, 1970

3,522,121
METHOD OF BONDING A FILLED EPOXIDE PUTTY TO A SURFACE
Leonard Robert Lovelock and Robert Henry Wren, London, England, assignors to International Standard Electric Corporation, New York, N.Y., a corporation of Delaware
Filed Nov. 8, 1966, Ser. No. 592,929
Claims priority, application Great Britain, Nov. 10, 1965, 47,659/65
Int. Cl. B32b 31/00
U.S. Cl. 156—153
15 Claims

ABSTRACT OF THE DISCLOSURE

A moisture retarding seal, useful for bonding polyethylene objects, is formed on a polyethylene surface by abrading said surface to chemically bond with a primer; applying to said abraded surface a primer comprising a mixture of an epoxide resin and a curing agent for said resin; applying to said primed surface a flexible and porous material which is impregnated by said primer; and then applying a putty, which includes an epoxide resin, a filler and a curing agent for said putty, to said primed surface before the primer has cured.

---

This invention relates to methods of making moisture retarding seals at surfaces of bodies and to epoxide resin systems therefor, and constitutes an improvement in, or modification of, copending application Ser. No. 492,590 (hereinafter referred to as the parent specification) filed Oct. 4, 1965, and assigned to the same assignee as the instant application, in accordance with which there is provided a method of bonding a filled epoxide putty to a portion of a surface of a body, comprising the steps of treating the portion to render it capable of chemically bonding to a primer to be applied thereto, applying the primer to the treated surface portion, said primer being a first mixture of an epoxide resin and a curing agent for that resin, applying the putty to the primed surface portion and then permitting or causing said primer to become cured.

A seal to the surface of a body can be stressed in two ways, either a tensile stress tending to shear the seal at the surface or a peel stress tending to peel the seal from off the surface.

A method of producing a seal with a high peel resistance is a feature of the parent application and a flexible resin layer having this property is an embodiment thereof. A rigid resin has a much higher tensile strength than a flexible resin, but a much lower peel resistance, and would not normally be expected to produce a satisfactory seal although it would produce a seal with a much higher resistance to tensile stress.

According to the present invention there is provided a method of bonding a filled-epoxide putty to a portion of a surface of a body, comprising the steps of treating the portion to render it capable of chemically bonding to a primer applied thereto, applying the primer to the treated surface portion, said primer being a mixture of an epoxide resin and a curing agent for that resin, applying to the treated surface portion at least one layer of a flexible porous material in such a manner as to cause some of the primer to penetrate through each said layer, applying the putty, which is a mixture of an epoxide resin and a curing agent for that resin together with suitable fillers, to the penetrated primer and then permitting or causing said primer to become cured.

According to one refinement of the present invention, means are provided to achieve adhesion of an epoxide resin putty to a polyethylene surface by roughening and/or flame polishing the surface of the polyethylene and applying an epoxide resin primer (said primer being either rigid or flexible when cured), and at least one layer of flexible and porous material, for example woven tape, that will allow some of the primer to penetrate through each said layer, applying said putty to the penetrated primer and then permitting or causing said primer to become cured.

According to one aspect of the present invention there is provided a method of making a seal to retard the ingress of moisture into a cable, comprising the steps of preparing the surface of the cable to render it capable of bonding to an epoxide resin system, priming the said surface with an epoxide resin system (said system being either rigid or flexible when cured) applying to the treated surface portion at least one layer of a flexible and porous material that will allow some of the primer to penetrate through each said layer, and before the curing of said epoxide resin system applying thereto an epoxide resin putty and then causing or permitting both resin systems to become cured.

According to another aspect of the present invention, a moisture retarding seal with a surface portion of a body is provided by a pair of epoxide resin systems and a layer of flexible and porous material, wherein the first epoxide resin system of said pair comprises a mixture of an epoxide resin and a curing agent for that resin, said first system being applied to the said surface portion of the body in conjunction with at least one layer of flexible and porous material, said material having a form that will allow said first system to penetrate through each said layer, and the second epoxide resin system of said pair comprises a mixture of said first, or a second epoxide resin, a curing agent for that resin and fillers, the constituents of such second epoxide resin system being so proportioned that it is initially in a plastic state.

The invention will now be particularly described by way of example, with reference to the accompanying drawings in which.

According to one example of the present invention a seal to a polyethylene sheathed cable is provided by the following method.

The surface of the polyethylene is rendered receptive to the application of a first epoxide resin system, being the aforesaid primer, by abrading and/or flame polishing said surface. Flame polishing is a treatment sufficient to modify the surface properties of the polyethylene sheath to render it chemically more capable of bonding to the primer applied thereto but not sufficient to cause changes in the bulk structure of the sheath material, such as may produce latent strains resulting eventually in failure of the cable.

Figure 1:
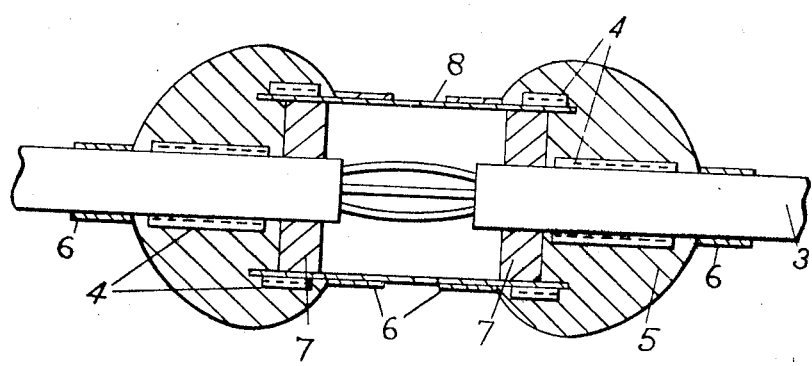
FIG. 1 is an axial section through a cable joint made according to the present invention.
Figure 2:
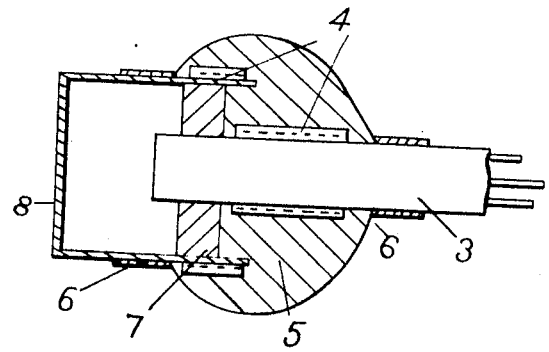
FIG. 2 is an axial section through a seal at the end of a cable made according to the present invention.

Suitable proection for a joint in a polyethylene sheathed cable may be provided by a length of polyethylene tube 8 shown in FIG. 1. The outer and inner surfaces of this tube are abraded and/or flame polished in a similar manner to the cable sheath.

Spacers 7 are built up at a short distance from the ends of the cable sheaths 3 by winding paper tape until the diameter of the spacers is equal to the internal diameter of the polyethylene tube.

The polyethylene tube is then slipped over the two spacers, to a position in which the tube extends beyond both spacers.

The primer is prepared by mixing together a resin which is a diglycidyl ether of bisphenol-A containing a reactive diluent to reduce the viscosity, with a hardener such as liquid polyoxyalkylene polysulphide and an accelerating agent which is a modified aliphatic amine.

The primer is then applied to the previously prepared polyethylene surfaces. A layer of open weave tape 4 is wrapped onto the primer on the cable sheath and the outer surface of the polyethylene tube so that the tape is penetrated by the primer, sufficient primer being added to the outer surface of the tape to ensure that the tape is completely covered and that no voids are left in the primer. Of course, more than one layer of tape may be used, although the single layer has been found satisfactory. Alternatively an open weave tape can be loaded or impregnated with primer and then applied to the treated surface portion.

The epoxide resin putty is prepared by mixing together a resin which is a diglycidyl ether of bisphenol-A, a thixotropic silica filler, alumina, furfuryl alcohol and polyethylene glycol with a hardener comprising a polyamide curing agent, a modified aliphatic amine, a non-leafing type aluminum powder, thixotropic silica filler and alumina. The hardener may alternatively comprise an aliphatic polyamine. Care must be exercised with these compounds as some are toxic. The proportion of fillers added to the resin mixture is controlled to produce a putty whose initial viscosity is similar to that of lead when heated to a temperature customarily used in making plumber's wiped joints, that is the putty must be sufficiently plastic to allow the wipes to be made but not so plastic as to sag under its own weight. The putty should preferably become relatively hard as a result of the curing process.

Before the primer has become cured the epoxide putty is applied to the primed surfaces of the cable sheath and polyethylene tube to form a joint 5. The joint may then be wiped smooth in a similar manner to a joint in a conventional lead-sheathed cable.

The axial end edges of the joint may be bound with a tape 6 prior to the application of the putty and primer, or at least prior to curing to prevent the formation of thin layers of jointing compound known in the art as "feathering" and to reduce the incidence of cracks in the completed joint which tend to propogate from such feathered edges.

The following example indicates a suitable primer for the purposes of this invention.

EXAMPLE 1

| Resin: | Parts by weight |
|---|---|
| (Epikote [1] 828) diglycidyl ether of bisphenol-A | 100 |
| Hardener: | |
| (Epikure [1] T) modified aliphatic amine | 10 |
| (Versamid [1] 125) polyamide curing agent | 86 |

EXAMPLE 2

This example is a suitable putty for the purposes of this invention which is compatible with the primer of Example 1.

| Resin: | Parts by weight |
|---|---|
| (Epikote [1] 828) diglycidyl ether of bisphenol-A | 100 |
| Thixotropic silica filler | 12 |
| Alumina | 200 |
| Furfuryl alcohol | 5 |
| Polyethylene glycol | 1 |
| Hardener: | |
| (Versamid [1] 125) polyamide curing agent | 100 |
| (Epikure [1] T) modified aliphatic amine | 12 |
| Thixotropic silica filler | 15 |
| China clay | 250 |

[1] Epikote and Epikure are registered trademarks of the Shell Chemical Corp. and Versamid is the trademark of the General Mills Corp.

The constituents of the hardener and resin are milled together until they are thoroughly intermixed.

The primer used in the parent specification is also suitable for the purposes of this invention.

Although a method of making a bond to a polyethylene-sheathed cable has been described, the techniques employed are equally applicable to bonds to other sheathing materials, such as polypropylene or other synthetic plastics materials, or even to metallic sheaths. In this case the flame-polishing treatment may be replaced by a suitable chemically equivalent treatment, for example etching or scouring, to render the surface receptive to the epoxide primer. Furthermore the method is obviously not restricted to making bonds with cable sheaths and will be useful in many cases where a peel-resistant bond between an epoxide putty and a metallic or plastics surface is desired.

The test apparatus of FIG. 1 of the parent patent can be used to determine the effectiveness of seals made by the present method.

What we claim is:

1. A method of bonding a filled epoxide putty to a surface of a body, comprising the steps of treating the surface to render it capable of chemically bonding to a primer, applying the primer to the treated surface, said primer being a mixture of an epoxide resin and a curing agent for that resin, applying to the treated and primed surface at least one layer of a flexible and porous material said primer penetrating through and covering each applied layer, and then applying a putty which includes an epoxide resin and a curing agent for that resin together with filler material to the treated and primed surface and said layer or layers before said primer has cured and then permitting said primes and putty to cure.

2. A method according to claim 1 in which the flexible and porous material comprises a woven tape.

3. A method according to claim 1 in which the surface is of polyethylene.

4. A method according to claim 1 in which the primer and flexible and porous material are applied to the treated surface in one operation, said flexible and porous material being impregnated with said primer before said one operation.

5. A method as claimed in claim 1, wherein said step of treating comprises roughening said surface.

6. A method as claimed in claim 1 wherein said step of treating comprises flame polishing said surface.

7. A method as claimed in claim 1 wherein said step of treating comprises roughening said surface and flame-polishing the roughened surface.

8. A method according to claim 1 in which the said putty is an epoxide resin having constituents so proportioned that the putty is initially in a plastic state.

9. A method as claimed in claim 1 in which the surface is the outer portion of a cable.

10. A method as claimed in claim 1 in which the primer consists of a resin comprising a modified diglycidyl ether of bisphenol-A containing a reactive diluent to reduce the viscosity, a hardener comprising a liquid polyoxyalkylene polysulphide and an accelerating agent comprising a modified aliphatic amine.

11. A method as claimed in claim 1 in which the primer consists of a resin, comprising a diglycidyl ether of bisphenol-A, a hardener and an accelerating agent.

12. A method as claimed in claim 11 in which the hardener comprises a polyamide curing agent.

13. A method as claimed in claim 11 in which the hardener comprises an aliphatic polyamine.

14. A method as claimed in claim 11 in which the accelerating agent comprises a modified aliphatic amine.

15. A method as claimed in claim 1 in which the putty comprises a resin including a diglycidyl ether of bisphenol-A, a thixotropic silica filler, alumina, furfuryl alcohol and polyethylene glycol with a hardener comprising a polyamide curing agent, a modified aliphatic amine, a non-leafing type aluminum powder, thixotropic silica filler and alumina, the proportions of the fillers being chosen to adjust the viscosity of the material so that it will not sag under its own weight as it becomes cured.

References Cited
UNITED STATES PATENTS

| | | | |
|---|---|---|---|
| 3,288,664 | 11/1966 | Hoppe | 156—330 X |
| 3,303,954 | 2/1967 | Beaudet et al. | 156—330 X |
| 3,306,800 | 2/1967 | Plueddemann | 156—330 X |
| 3,342,660 | 9/1967 | Angerer et al. | 156—330 |
| 3,346,443 | 10/1967 | Elmer | 161—184 X |
| 3,352,955 | 11/1967 | Pigott et al. | 156—330 X |
| 3,360,425 | 12/1967 | Boone | 161—186 |
| 3,419,450 | 12/1968 | Krysiak | 156—330 |

CARL D. QUARFORTH, Primary Examiner

S. J. LECHERT, Jr., Primary Examiner

U.S. Cl. X.R.

156—330; 161—184